United States Patent [19]
Lipchock et al.

[11] Patent Number: 5,903,639
[45] Date of Patent: May 11, 1999

[54] CUSTOM ROUTING FOR MULTIPLE CARRIER INTERCONNECTION

[75] Inventors: Michael J. Lipchock, Frederick, Md.; Douglas R. Jones, Mount Laurel, N.J.

[73] Assignee: BellAtlantic Services, Inc., Arlington, Va.

[21] Appl. No.: 08/851,549

[22] Filed: May 5, 1997

Related U.S. Application Data

[63] Continuation-in-part of application No. 08/756,013, Nov. 25, 1996, abandoned, which is a continuation-in-part of application No. 08/753,153, Nov. 21, 1996.

[51] Int. Cl.⁶ ............................................. H04M 7/00
[52] U.S. Cl. .......................... 379/220; 379/221; 379/207
[58] Field of Search .................................. 379/220, 207, 379/229, 230, 221

[56] References Cited

U.S. PATENT DOCUMENTS

| | | | |
|---|---|---|---|
| 5,475,749 | 12/1995 | Akinpelu et al. | 379/201 X |
| 5,550,912 | 8/1996 | Akinpelu et al. | 379/201 X |
| 5,796,813 | 8/1998 | Sonnenberg | 379/201 X |

Primary Examiner—Creighton Smith
Attorney, Agent, or Firm—McDermott, Will & Emery

[57] ABSTRACT

A system and method for differentiating and routing local calls in interconnected networks of a predominate local exchange carrier (LEC) having an advanced intelligent network (AIN), and a competing local exchange carrier (CLEC) having CLEC subscriber stations connected to switching systems in the LEC network. An originating trigger is set in the switching systems of the LEC network for CLEC subscriber stations. Activation of the trigger causes a message to the control point of the AIN and a determination of whether or not the call is local, the CLEC to which the station subscribes, and the routing directions for that CLEC. A response message from the control point to the switching system causes the switching system to route the call in accord with the instructions contained therein. The system routes non-local calls based on primary interexchange carrier (PIC) functionality in the switching systems. The determinations made by the control point require the accessing of databases. One of the databases is associated with the AIN control point and the other is separate therefrom. The other database may be combined with a database associated with a switch which is provided for routing service calls to LEC or CLEC facilities. The system is adapted for integration with a system for routing service calls in interconnected LEC and CLEC networks.

23 Claims, 10 Drawing Sheets

|  | 5ESS | DMS-100 | EWSD | 1AESS | DMS-10 |
|---|---|---|---|---|---|
| 0- | OHD ex. Centrex who use LCC | OHD w/ optional Adjunct Proc. for branding | OHD w/ optional Adjunct Proc. for branding | OHD w/ escape code, Adjunct Processor | Adjunct Processor |
| 0+ Local | OHD w/ Adjunct Processor | OHD w/ Adjunct Processor | OHD w/ Adjunct Processor | OHD w/ Adjunct Processor | Adjunct Processor |
| 411 | OHD | OHD | OHD | OHD | Adjunct Processor |
| 555-1212 | OHD | OHD | OHD | OHD | Adjunct Processor |
| 7-Digit Local | LEC | LEC | LEC | LEC | LEC |
| 10-Digit Local | LEC | LEC | LEC | LEC | LEC |

FIG. 7

CUSTOM ROUTING FOR MULTIPLE CARRIER INTERCONNECTION

RELATED APPLICATIONS

This application is a continuation-in-part of application Ser. No. 08/756,013 filed Nov. 25, 1996, now abandoned, for Custom Routing for Multiple Carrier Interconnection, attorney number 680-193A which is a continuation-in-part of 08/753,153, filed Nov. 21, 1996, pending. That application is assigned to the assignee of the instant application and is incorporated by reference herein in its entirety.

TECHNICAL FIELD

This invention relates to the implementation of customized routing in the interconnection of public switched telecommunications networks and more particularly relates to the provision of such routing for both unbundled switching and resale.

ACRONYMS

The written description uses a large number of acronyms to refer to various services, messages and system components. Although generally known, use of several of these acronyms is not strictly standardized in the art. For purposes of this discussion, acronyms therefore will be defined as follows:
Action Control Point (ACP)
Advanced Intelligent Network (AIN)
Area Code (NPA)
Automated Message Accounting (AMA)
Automated Number Identification (ANI)
Call Processing Record (CPR)
Central Office (CO)
Competing Local Exchange Carrier (CLEC)
Common Channel Signaling (CCS)
Dual Tone Multifrequency (DTMF)
End Office (EO)
Get Data Interface (GDI)
Handoff Switch (HSW)
Integrated Services Digital Network (ISDN)
Integrated Service Control Point (ISCP)
Intelligent Network (IN)
Interexchange Carrier (IXC)
Line Class Codes (LCCs)
Local Access and Transport Area (LATA)
Local Exchange Carrier (LEC)
Off-Hook Delay (OHD)
Office Code (OC or NXX)
Operator Services Position System (OSPS)
Operator Services Signaling (OSS)
Originating Switch (OSW)
Point in Call (PIC)
Point in Routing (PIR)
Point of Presence (POP)
Private Branch Exchange (PBX)
Service Creation Environment (SCE)
Service Control Point (SCP)
Service Switching Point (SSP)
Signal Switching Point (SSP)
Signal Transfer Point (STP)
Signal Control Point (SCP)
Signaling Point (SP)
Signaling System 7 (SS7)
Signaling Switching Point (SSP)
Signaling Transfer Point (STP)
Traffic Operator Position System (TOPS)
Traffic Service Position System (TSPS)
Transaction Capabilities Applications Part (TCAP)
Transmission Control Protocol/Internet Protocol (TCP/IP)

BACKGROUND OF THE INVENTION

Recent legislative and regulatory changes require that a local exchange carrier (LEC) unbundle certain network elements and services and offer use of those elements and services to other carriers for resale to end users. In one required implementation, the LEC will sell the other carrier an unbundled port on an end office switch and allow the other carrier to become a competing local exchange carrier (CLEC) by reselling services of the switch to end users having local loops which connect to the end office switch. Those statutory and regulatory changes also specify that customized routing is required for both unbundled switching and for resale. Customized routing is the term used in the regulations for routing calls made in the local exchange carrier (LEC) switch to locations other than those that exist today. The primary applications are for unbundlers and resellers to have operator (0+, 0−) calls and directory assistance calls (411/555) routed to their own platforms. Other types of calls could possibly be applicable as well, but the 0+/0−/411 calls are the ones in most immediate demand.

This type of customized routing in an interconnection environment represents a capability that currently does not exist in the network architecture of LECs. The currently used switches in the LEC public switched telephone networks were not designed with this functionality in mind. The capability does not exist and the switches are not readily adaptable to provide customized routing. This applies to all of the predominantly deployed switches (5ESS, 1AESS, EWSD, and DMS-100) from three major switch manufacturers, Lucent Technologies (formerly AT&T), Nortel, and Siemens.

One prospective unbundler and reseller has suggested use of line class codes (LCCs) to accomplish this purpose. However, any implementation of customized routing using LCCs would require use of an excessive number of such codes and would produce other serious problems. Not only is there a limit to the capacity of the switch regarding the number of LCCs that could be physically provisioned, managing the new operational environment is at least as critical. The provisioning and maintenance systems that support the LEC's services cannot be ignored. These systems allow telephone services to be ordered, provisioned, monitored, repaired, and billed; they are an essential element in contributing to the quality of service enjoyed today by the public LEC's customers.

Without incorporating new LCCs into the operations systems that support services, severe problems would have to be expected in provisioning services. Manual provisioning would require human intervention and complex lookups that involve locating the correct code in a table of thousands. Such a process would be prone to both error and delay resulting in service degradation. It is for this reason that today's process is mechanized. In an environment with considerably more codes, a mechanized process would be even more important.

The line class code approach would use existing switch resources in a manner that was never intended. Such an application is untested and to some degree would have unknown consequences if deployed on any meaningful scale. Even the proponent of this approach has indicated that LCCs would be an interim and limited workaround which would need to be reversed once a longer term solution could be developed.

Another proposal for coping with the problem has been the possible use of an Advanced Intelligent Network (AIN) common channel signaling (CCS) solution. However, this is not feasible in view of the fact that, while the AT&T 1AESS switch has AIN capability, it will not apply AIN type processing to 0 calls. In that switch, the 0 number routing functionality takes precedence over all other types of call processing, including AIN processing.

The patent literature suggests various approaches to more or less analogous problems.

U.S. Pat. No. 5,550,912, issued Aug. 27, 1996 to Akinpelu et al., and U.S. Pat. No. 5,475,749, issued Dec. 12, 1995 to Akinpelu et al., assigned to AT&T Corporation, disclose specialized call processing in an interexchange carrier (IXC) network to route calls via a LEC and a CLEC or competing local exchange carrier (termed a 'competing access provider' or 'CAP' in these patents).

In one aspect of the Akinpelu et al. call processing, the switch of the IXC network serving as the egress point for a call, checks the area code (NPA) and office code (OC or NXX) of the dialed number to determine if 'exception' routing is necessary, i.e., to determine if the destination station lies in a region served by a LEC and one or more CLECs. If no exception routing is necessary (LEC only), the egress switch routes the call through the LEC carrier switch in the normal manner. However, if exception routing is necessary, the egress switch checks the last four digits of the called number against an exception table to determine if the particular number is served through a CLEC switch or a LEC switch. The table look up can utilize translation tables in the egress switch or tables in a remote database. If the last four digits from the dialed number are listed in the exception table, then the egress switch routes the call through the CLEC's switch. If the last four digits from the dialed number are not listed in the exception table, then the egress switch routes the call through the LEC's switch. If the called customer receives service from both a CLEC and a LEC, the egress switch will route the call through the CLEC switch unless all trunks between the IXC egress switch and the CLEC switch are busy, in which case the egress switch routes the call via the LEC switch.

The Akinpelu et al. Patents also disclose a specialized translation and routing process at the ingress switch of the IXC network. In some cases, a different egress switch serves a CLEC than serves a LEC. For such a case, the ingress switch queries a database. The database identifies the called customer's preferred local exchange carrier and possibly an alternate carrier. Based on the local carrier identification (LEC or CLEC), the ingress switch routes the call through the appropriate egress switch. Data identifying the IXC egress switch, the preferred and alternate carriers and the identity of the terminating switches of the preferred and alternate carriers are transmitted via CCS messages to the egress switch, to eliminate the need for further translation by the egress switch.

U.S. Pat. No. 5,473,681, issued Dec. 5, 1995 to B. Waring Partridge, III, assigned to AT&T Corporation, relates to processing of telephone calls through two or more carriers. Such calls may involve a local exchange carrier and an interexchange carrier, a wireless carrier and a local carrier, or any combination of multiple local exchange carriers and interexchange carriers. In a mobile telephone call, for example, a wireless carrier may route the call through an interexchange carrier to a distant local exchange carrier to complete the call.

A second carrier is preselected as a default primary interexchange carrier (PIC). However, the caller also may select the second carrier on a per call basis by dialing an interexchange access code.

Partridge, III teaches that, for each call in which a telecommunications carrier code specifying a particular carrier is supplied by a caller, the network of the local service provider routing such a call transmits to the selected IXC carrier network an indication that the carrier code was dialed by the caller. The local service provider network may also transmit an indication, if applicable, that the entered carrier code is not the default carrier code. The local service provider network transmits these indications regarding second carrier selection as SS7 messages or portions thereof. The second or interexchange carrier may use the carrier selection indications, for example, to control provision of certain special services on the respective calls.

U.S. Pat. No. 5,333,184, issued Jul. 26, 1994 to Doherty et al., assigned to AT&T Bell Laboratories, discloses a system for recording the 'primary interexchange carrier' identification for the called party. The interexchange carrier typically processes calls from call*ing* parties who have PIC'd that carrier for their long distance services. By recording the PIC of the call*ed* party as well, the interexchange carrier can offer special billing treatments for calls from one subscriber to any other one of that carrier's own subscribers.

U.S. Pat. No. 5,311,572, issued May 10, 1994 to Albert Friedes and Om P. Mahajan, assigned to AT&T Bell Laboratories, discloses a system for processing a database-queried call using the call processing capabilities of a carrier's database as well as a subscriber's database. The carrier's database is a routing database. The subscriber's database contains prestored programs and calling party identification related information including background of the caller.

U.S. Pat. No. 4,565,903, issued Jan. 21, 1986 to Douglas H. Riley, assigned to AT&T Bell Laboratories, relates to call routing in a multi-carrier environment, in particular to the selection of an interexchange carrier and the routing of a call to the selected carrier.

A subscriber is allowed to presubscribe any carrier by having information identifying that carrier entered in a memory associated with the subscriber's terminal link. The subscriber can then have interexchange calls routed to that carrier without taking any additional steps to select or specify the carrier. The subscriber can select any available carrier on a per-call basis by transmitting, e.g., dialing, signals identifying the desired carrier. Thus, a subscriber may prefer one carrier for certain calls and another for other calls. A caller can complete interexchange calls without having to select a carrier by identifying in a second memory a default carrier for calls for which no carrier is specified.

A carrier for an originating terminal link's telephone call is selected by examining dialing signals or the like received over the terminal link to determine whether they include signals identifying a carrier separate from the signals identifying the call destination-identifying. If a carrier cannot be so identified, the contents of a memory associated with the terminal link are examined to determine whether they identify a carrier, typically based on a presubscription to the carrier's services. A second memory can be examined to determine whether they identify a carrier (default) for use when even the memory associated with the terminal link does not identify a carrier. When a carrier cannot be identified, a request is made over the terminal link that a carrier be identified. Once a carrier is identified, the local exchange network attempts to connect the call to that carrier.

U.S. Pat. No. 5,517,562, issued May 14, 1996 to Von K. McConnell, assigned to Independent Telecommunications Network, Inc. of Overland Park, Kans., discloses an intelligent network type system utilizing the networks of independent telephone companies and other telecommunication service providers to offer centralized, custom subscriber services. McConnell provides a centralized network Service Control Point (SCP) and an associated Service Creation Environment (SCE). Individual service providers have service creation terminals of various types, and the SCE terminals are linked to a service creation server. The server also communicates with the network SCE. Participating service providers may each operate a dedicated SCP linked to the network SCP via a high speed data link. Customized services are created via the diverse SCE terminals, and appropriate records are established in one or more of the SCPs to control actual provision of services.

U.S. Pat. No. 5,550,911, issued Aug. 27, 1996 to Bhagat et al., assigned to Lucent Technologies Inc., which is the telecommunications equipment company recently spun off from AT&T, discloses call processing techniques for routing calls to an adjunct processor. The adjunct may connect to an originating switch (OSW), or the OSW may access a remote adjunct through a handoff switch (HSW) when the local adjunct is unavailable. The OSW maintains an automatic number identification (ANI) based trigger table. The OSW compares information relating to an incoming telephone call to the customer's trigger table to determine if the call requires processing via an adjunct. If an adjunct is required, the OSW determines the type of adjunct necessary, identifies an adjunct that is capable of processing the call and routes the call to the identified adjunct.

Once the call reaches the adjunct, the OSW or the HSW transfers information to the adjunct, including the ANI information relating to the particular call. The adjunct stores customer specific applications, and processes the call in accord with one such application selected in response to the call related information from the switch.

The adjunct may operate in a query mode to provide information to the switch without interaction with the caller, or the adjunct may interact with the caller using in-band communications. In the query mode, there is no voice connection to the adjunct. The switch is free to route the call upon completion of the query operation. In the interactive mode, the voice call is completed to the adjunct, so that the adjunct may send voice prompt messages and receive DTMF responses. Upon completion of an interactive operation, the adjunct transmits a release instruction to the switch. The release instruction may include a redirection request for transferring the call to an actual destination.

THE PROBLEM

Recent legislative and regulatory changes set forth the requirements under which competition between public telephony carriers is permissible in both local and long distance markets. It is in the interest of the public and the affected carriers to offer such new services at as early a date as possible. In order that this may be regulatorily feasible it is essential that the above described requirements with respect to customized routing in the interconnection be satisfied in an expeditious manner. It is particularly important that requirements be met in a manner which will provide the mandated service effectively and economically without degradation of the quality of service that the public now receives. It is also desirable that the new services are of such a nature as to avoid default of any significant class of calls from a competing carrier to the dominant carrier operating the network to which interconnection is made.

SUMMARY OF THE INVENTION

To satisfy the request for segregated call treatment using existing switch technology, the inventors have developed a Specialized Routing Proposal for CLEC Interconnection. The proposed solution utilizes different unique combinations of AIN processing, line class codes (LCCs) set in the switches, and an adjunct processor. The precise combination of these technologies is varied depending on the type of end office switch.

As part of the requirement for unbundling of switch services and service resale, the Federal Communications Commission (FCC) has mandated customized routing. Specifically, customized routing requires the local exchange carrier to modify the switch functionality to route certain calls from customers of any competing local exchange carrier (CLEC) to a location different from the routing destination for such calls if originated from a LEC customer. Examples of such calls include directory assistance calls (e.g., 411), and 0+, 0− calls.

The switches existing in the network, however, were not designed for such selective alternate routing. For example, existing switches are designed to always route a 411 call from any connected subscriber's line to a port assigned for such calls, typically a port to a traffic operator position system (TOPS). With customized routing, 411 calls from the LEC's customers should still go to the same port, however, the LEC's network must route 411 calls from each CLEC's customers in some alternate manner selected by the CLEC, e.g., to the CLEC's operator system.

The Specialized Routing Proposal for CLEC Interconnection proposed according to the invention utilizes a hybrid solution combining AIN processing, line class codes (LCCs) set in the switches, and an adjunct processor interconnected on a trunk group going to the traffic operator position system (TOPS). The precise combination of these three technologies differs depending on the precise type of end office switch, but all of the specific hybrid solutions utilize certain common principles. With respect to the hybrid solution proposed for the 1AESS type end office switch the invention comprehends the following.

The 1AESS switch has AIN capability, but will not apply AIN type processing to 0 calls. In that switch, the 0 number routing functionality takes precedence over all other types of call processing, including AIN processing.

In a 0+ call, the customer dials a 0 followed by a seven or ten digit destination telephone number. In a 0− call, the customer dials a 0 and then waits for an operator to answer and provide assistance. 0+ ten digit calls which relate to long distance toll calls will be routed using the PIC and 2PIC for the customer's long distance carriers in the current manner. However, currently, all 0+ local calls and all 0− calls go to the LEC operator system. To provide the customized routing for 0 calls through the 1AESS switch according to the invention an adjunct processor or intelligent peripheral is employed on a designated trunk group between the end office switch and the telephone operator position system (TOPS) or equivalent operator system for handling 0+ local calls and 0− calls.

The adjunct processor comprises a small programmable telephone switch with an internal connection to a routing database or translation table. The adjunct processor will receive the dialed digits and the automated number identification information (ANI) identifying the calling customer's line. The processor will utilize the ANI to access the routing database and determine the calling party's local exchange carrier (LEC or one of a plurality of CLECs). If the ANI corresponds to a customer of one CLEC, and that one CLEC accepts the type of call in question (0+ local or 0–), then the processor routes the call over a trunk to the one CLEC's facilities. Another CLEC may elect to have the LEC process the call but demand that the LEC provide a message to the customer identifying the CLEC. In such a case, the processor may 'brand' the call (play the CLEC's chosen announcement message) and then route the call to the LEC's traffic operator position system for further processing. If the caller's ANI is not listed in the database in the adjunct processor, the processor processes the call as one from a customer of the LEC. In such a case, the processor switches the call through to the traffic operator position system for otherwise normal processing by the LEC operator system and associated local telephone network.

Processing of directory assistance calls (411/555) through the 1AESS will utilize AIN processing. For customer's of the CLECs, an off-hook delay trigger is set in the serving end office switch. When the customer takes the telephone off-hook and dials any number, the 1AESS central office launches a query to the ISCP. The query includes the dialed digits and the ANI identifying the calling party's line. The ISCP will store a record for the CLECs' customers indicating the call processing for directory assistance calls (411/555) selected by each carrier.

If the CLEC elects to process the directory assistance calls (411/555), the record in the ISCP will identify a trunk group to the CLEC's network. The ISCP transmits a response back to the end office switch instructing the switch to route the call over the CLEC's directory assistance trunk group. Alternatively, the CLEC may elect to have the LEC process the directory assistance calls, albeit with a CLEC branding message inserted by the LEC. In this alternative call processing, the ISCP returns a response instructing the end office switch to route the call to the LEC network elements processing directory assistance calls (e.g., to a traffic operator position system).

For the CLEC customers, all outgoing calls will hit the off-hook delay trigger and result in a query to the ISCP. If the call is not for directory assistance and the CLEC has not requested some other specialized AIN routing by the LEC, the ISCP returns a response instructing the LEC end office switch to route the call based on the dialed information in the normal manner. This typically results in a default to routing through the LEC's local network.

For the LEC's customers, processing of directory assistance will utilize the switch routing functionality used today to route the calls to the traffic operator position system or the like that handles such calls, in the same manner used on all directory assistance calls today. In particular, there will be no trigger set and no AIN processing of such calls from the LEC's customers.

In other types of switches, such as the AT&T 5ESS, the NorTel DMS-100 and the Siemens EWSD, the switches can apply AIN processing on 0 number calls. In these switches, the AIN processing results in routing of the directory assistance calls (411/555) to the CLEC or to the LEC operator position system as discussed above, and 0– minus calls will be AIN processed and routed to the CLEC or to the LEC operator position system in the same manner. The 0+ calls would go through the adjunct processor for segregation and/or branding as discussed above relative to the 1AESS.

Line class codes are used in certain types of switches to patch or fix problems peculiar to the individual types of switches. For example, in the 5ESS, the switch can not apply an off-hook delay type trigger for AIN processing of calls originating on Centrex lines. For Centrex lines, line class codes (LCCs) are used to define the segregated routing functionality. For example, line class codes define the routing of all 0– calls from Centrex lines to the trunk group going to the adjunct processor. The processor segregates and/or brands such calls, as discussed above. Similarly, the line class codes in the 5ESS instruct the switch to route directory assistance calls from the CLEC's Centrex customers over the designated trunk group to the CLEC's facilities. It its currently deployed configuration, the DMS-100 can not apply off-hook delay triggers to ISDN lines. In that switch, one or more line class codes are used to route 0+ local calls and 0– calls to the adjunct processor and to route directory assistance calls to the CLEC.

It is also a feature of the invention that the network may provide a carrier selection override. To this end an originating trigger may be set in the end office switches for lines to LEC subscribers who desire such over-ride capability. The switch will launch a query to the ISCP when the caller prefixes the service call with some character such as "*". The ISCP then responds with routing directions to the service platform of the caller's choice. In this manner, the LEC's customer's might access a CLEC's 0+ or directory assistance services.

According to another embodiment of the invention there is provided a methodology for call screening which is capable of insuring that local calls are detected and directed to CLEC facilities in accord with preset specifications of the CLEC which is involved. To this end CLEC calls detected by the off-hook delay trigger in the originating end office are sorted to identify and brand local calls. This procedure is preferably implemented using facilities which are available to implement the previously described embodiments of the invention. Thus, according to this embodiment of the invention the database in the adjunct processor has stored therein a DNA-NXX to DNA-NXX table from which it is possible to determine which calls are local. The adjunct processor is connected by a data link to the ISCP and this information is available to the ISCP in response to an inquiry following the ISCP receipt of the message from the originating end office when the originating trigger is tripped. Such information is then utilized in the further processing of the call. Non-local calls are submitted to PIC/PIC2 processing while the now identified local calls are directed to a CLEC or to the LEC, as may be directed in the pre-established tables in the ISCP.

Figure 5:
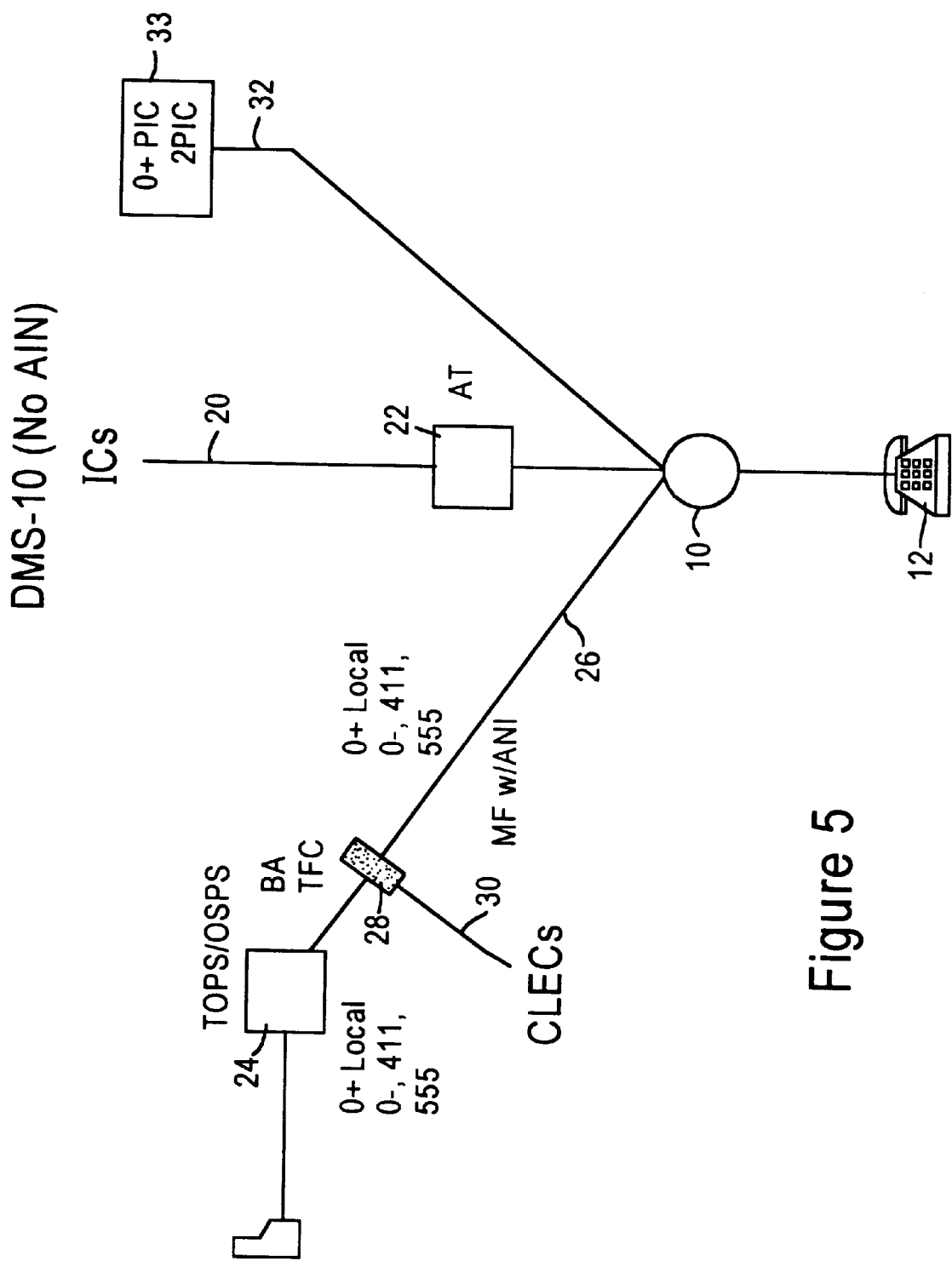

FIG. 5 is a simplified functional block diagram showing the architecture and operation of the system of one embodiment of the invention with respect to NorTel DMS-10 switches in a local exchange carrier network providing interconnection with a competing local exchange carrier (CLEC).

Figure 6:
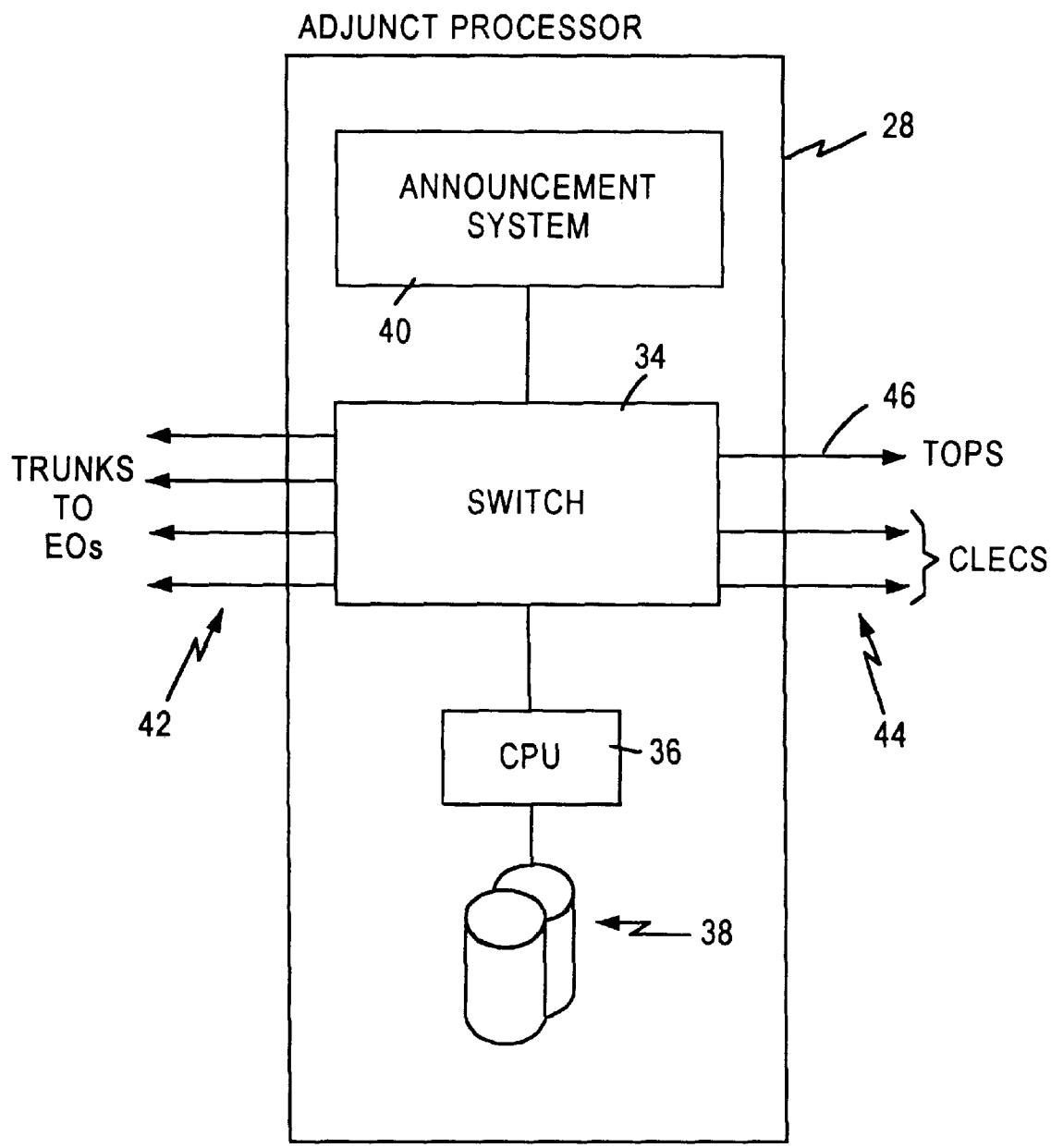

FIG. 6 is a simplified block diagram showing one embodiment of adjunct processor suitable for use in the system of the invention.

FIG. 7 is tabular illustration of the operation of the invention for handling the various types of custom calls with the various involved switches.

Figure 8:
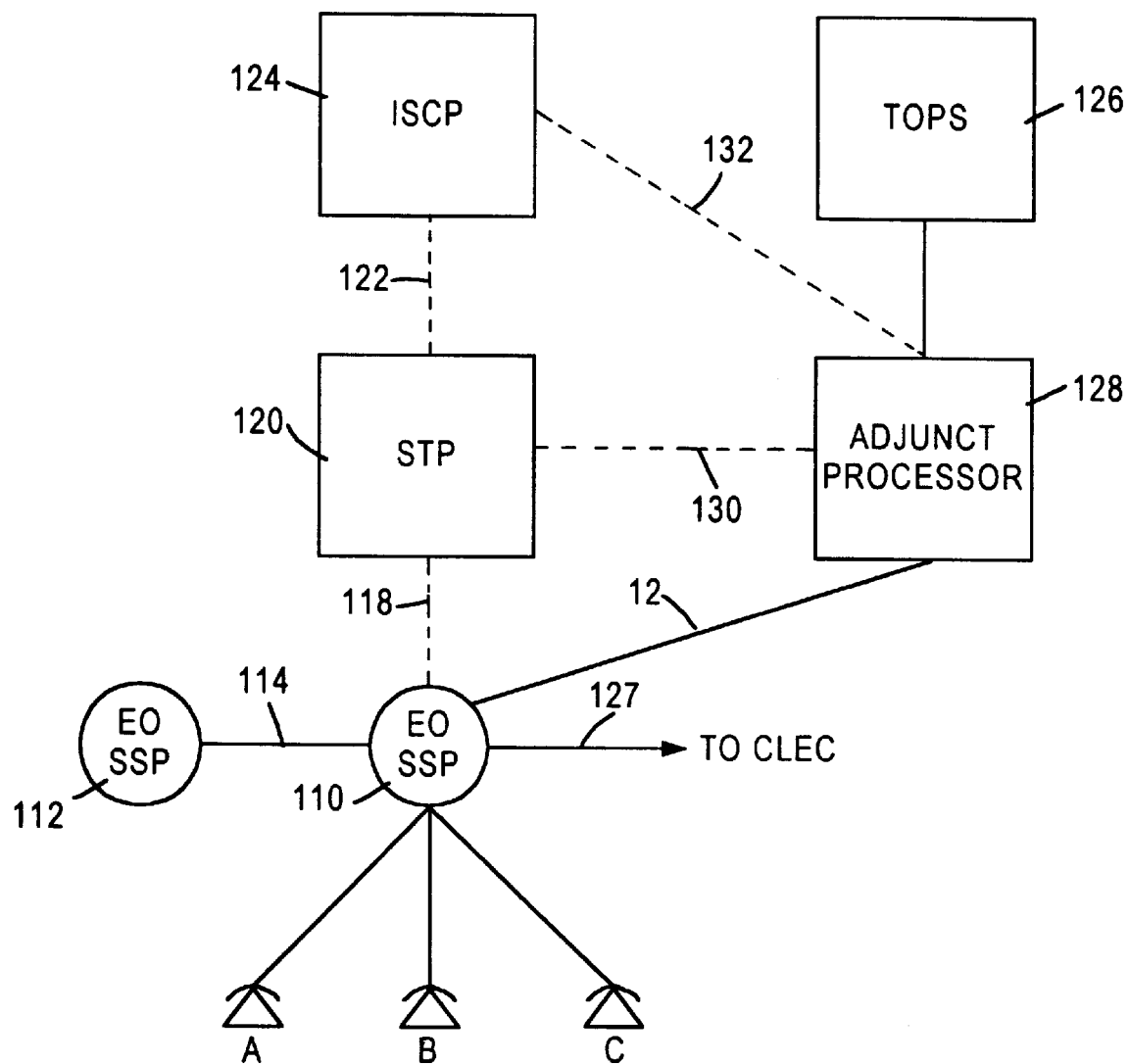

FIG. 8 is a block diagram of a further embodiment of the invention.

Figure 9:
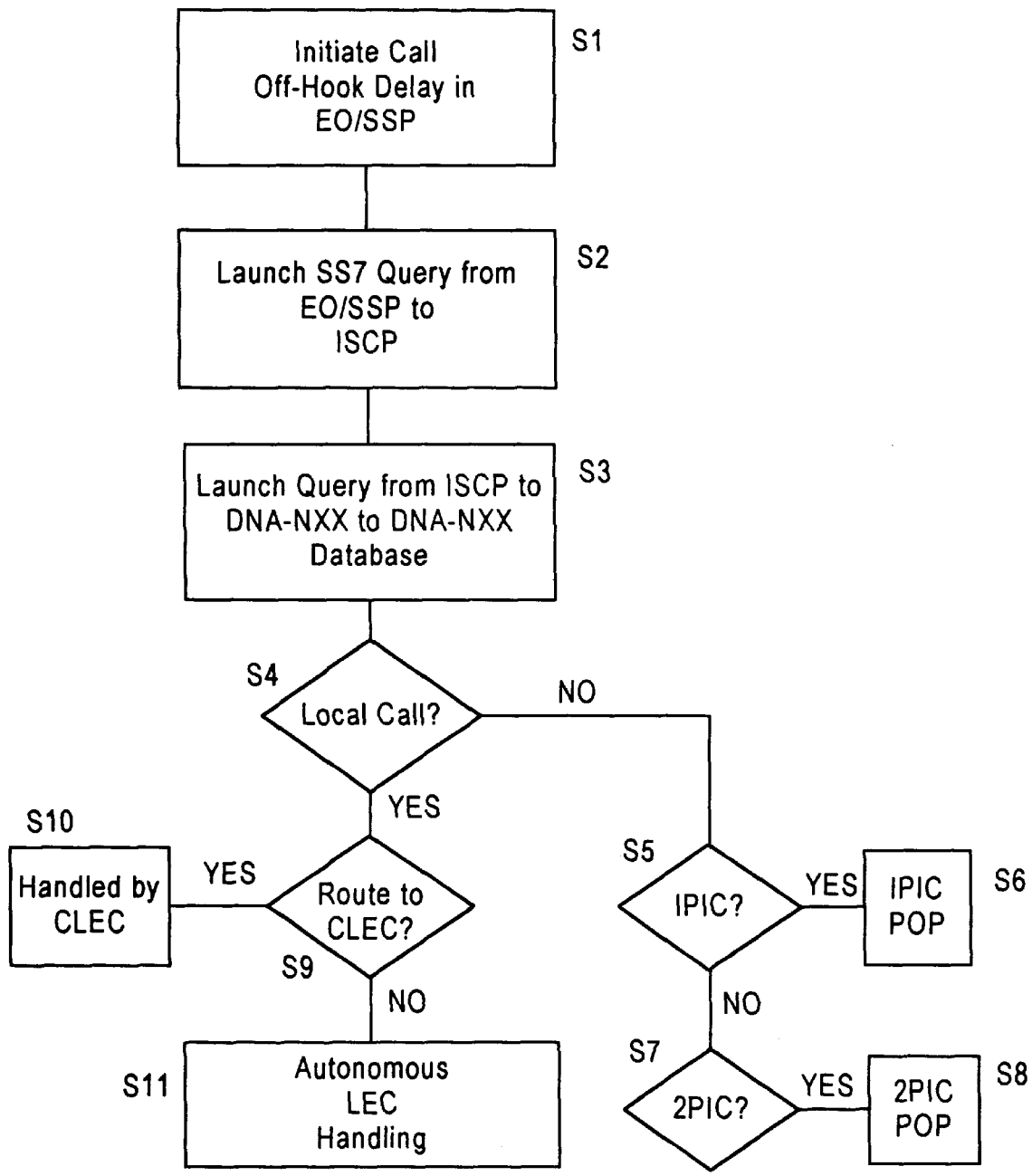
Figure 10:
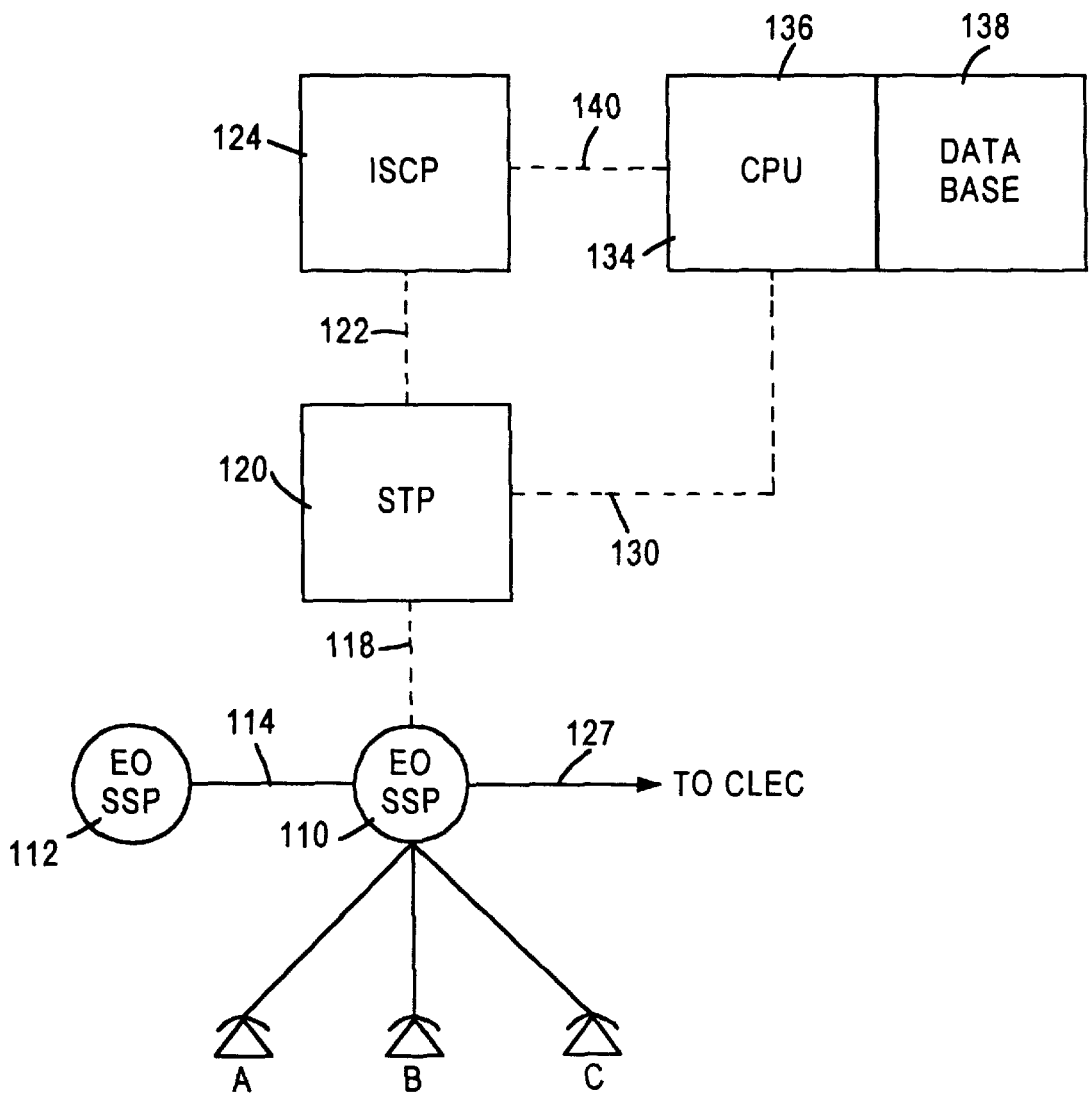

FIG. 9 is a flow diagram illustrating the operation of the embodiments of the invention in FIGS. 8 and 10.

FIG. 10 is a block diagram of yet another embodiment of the invention.

DESCRIPTION OF THE INVENTION

Figure 1:
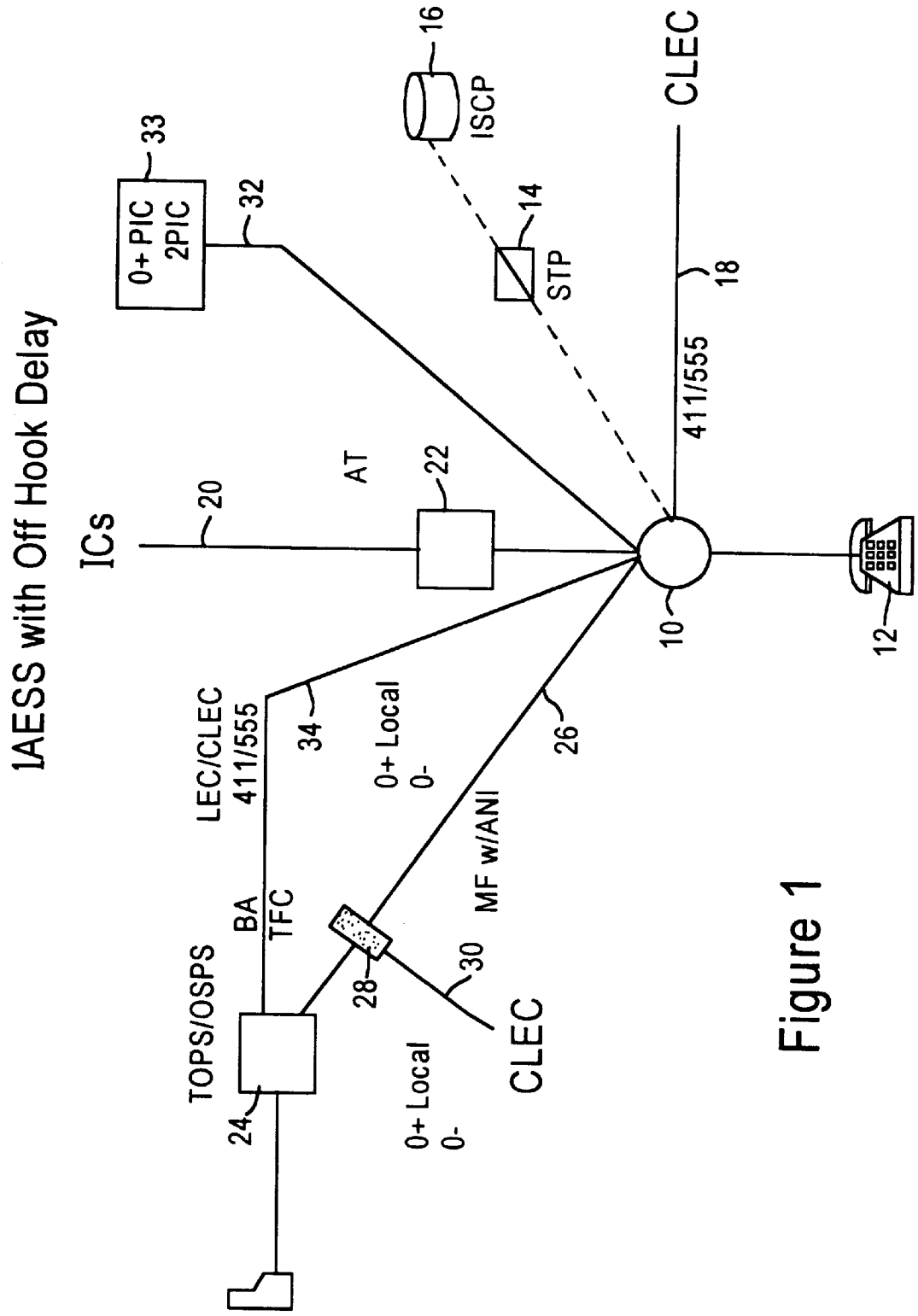
FIG. 1 is a simplified functional block diagram showing the architecture and operation of the system of one embodiment of the invention with respect to AT&T 1AESS switches in a local exchange carrier network providing interconnection with a competing local exchange carrier (CLEC).

Referring to FIG. 1, there is shown at 10 a 1AESS end office (EO) switch or switching system serving subscribers such as the telephone station indicated at 12. The EO switch 10 is part of a local exchange carrier (LEC) network having AIN common channel signaling (CCS) as indicated by the signaling transfer point (STP) 14 and integrated service control point (ISCP) 16. It is assumed that the EO switch 10 has service switching point (SSP) capabilities. The switch 10 is connected to the network of a competing local exchange carrier (CLEC) by a trunk 18. The switch 10 is also connected to an interexchange carrier (IC or IXC), for example, via a trunk 20 and tandem 22. The LEC network which includes the EO switch 10 has a traffic operator position system (TOPS) or operator services position system (OSPS) 24 connected to the switch 10 by a trunk or trunk group 26. An adjunct processor 28 is provided in the trunk 26 and connects to the CLEC network via a group trunk 30. Also connected to the EO switch 10 is a trunk 32 which handles the PIC and 2PIC calls as presently will be explained.

Referring to FIG. 6 there is shown a simplified diagram of an adjunct processor suitable for use in the system of the invention. The adjunct processor is shown in FIG. 6 at 28, as in FIGS. 1–4. The adjunct processor comprises a programmable switch and is shown as a switch fabric 34, CPU 36, and routing or translation table databases 38. The adjunct processor includes an announcement system or digital voice platform 40. The switch is connected to the various end offices, such as EO 10 in FIG. 1, by incoming trunks 42, to the CLECs by trunks 44, and to the TOPS or OSPS by trunk 46. The incoming trunks are preferably Feature Group D trunks carrying the ANI in their signaling and typically using operator services signaling (OSS). The adjunct processor may be of the type marketed by Syntellect Network Systems, Inc. as its System/2000, a Telstar Network Switching System and a Nexus Service Control Point sold as a combined system by IEX Corporation, or their equivalents.

Operation is now described in terms of the various switches:

1AESS Switch—AT&T

The 1AESS switch will not apply AIN processing to 0 calls. In that switch, the 0 number routing functionality takes precedence over all other types of call processing, including AIN processing.

The calls which initially are to be processed by the system of the invention consist of the following:
0+ local calls
0− calls
0+ long distance calls
411 directory assistance calls
555-1212 directory assistance calls
7 digit local calls
10 digit local calls Because the nature of the 1AESS switch is such that it will not apply AIN type processing to 0 calls, i.e., it cannot differentiate LEC 0 calls from CLEC 0 calls, a different handling is necessary then would be the case if AIN alone could be relied upon to separate the LEC and CLEC calls. To cope with this problem and to facilitate other functions of specialized routing pursuant to the invention, an off-hook delay trigger is set in all serving end office EO switches for the lines of all customers of CLECs.

When any CLEC customer takes the telephone off-hook and dials any number, the EO or central office switch (including a 1AESS switch) launches a query to the ISCP. The query includes the dialed digits and the ANI identifying the calling party's line. The ISCP will store in its database a record which identifies the CLEC customers and from this database will be able to determine how a 0 call from a particular line should be served, in the instant case, through a 1AESS switch. As a result the ISCP will return a response to the serving 1AESS end office switch instructing it to route the call to the operator system (TOPS or OSPS) used by the LEC via the trunk group 26. The 1AESS switch will accordingly route such calls via trunk 26 toward the TOPS or OSPS 28 used by the LEC.

The adjunct processor 28 will receive the dialed digits and the automatic number identification information (ANI) identifying the calling customer's line. The processor will utilize the ANI to access the CLEC table and determine the calling party's competing local exchange carrier CLEC, or default to the LEC. If the ANI corresponds to a customer of a CLEC, and that CLEC's translation shows that it accepts the type of call in question (0+ local or 0−), then the processor will route the call over a trunk group, such as the trunk group 30, to that CLEC's facilities. It will be understood that while one trunk is illustrated there will be sufficient CLEC ports on the adjunct and sufficient trunk group capacity to handle the number of CLECs requiring service.

Another CLEC may elect to have the LEC process the call in the same TOPS/OSPS which handles its own calls, but may require that the LEC deliver a message to the customer identifying the CLEC. In such a case, the adjunct processor can use its announcement system to 'brand' the call (play the chosen announcement message of the CLEC), and then route the call to the telephone operator position system 24 used by the LEC for further processing. If the caller's ANI is not listed in the database in the adjunct processor, indicating that it is a LEC customer, the processor processes the call as a call from a customer of the LEC. In such a case, the processor switches the call through to the traffic operator position system 24 for otherwise normal processing by the LEC operator system and associated local telephone network.

1+ ten digit inter LATA long distance calls will be routed using the primary interexchange carrier PIC methodology currently in use for the customer's long distance carriers based on existing switch translations. These calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position system or TOPS/OSPS. This is shown in FIG. 1 on the trunk group 32 to the TOPS/OSPS 33.

Directory assistance calls (411/555-1212) are capable of being handled by the version (0.0) of AIN which is available in 1AESS switches. These calls encounter the off-hook delay (OHD) trigger in the serving switch EO or central office-switch (including a 1AESS switch) and that switch launches a query to the ISCP. The query includes the dialed digits and the ANI identifying the calling party's line. The ISCP will store in its database a record which identifies the CLECs and the CLEC's customers. From this database the ISCP will be able to determine that a 411/555 call from a line belongs to a particular CLEC and that such a call should be routed in the manner directed by that CLEC.

According to one option which may be provided to the CLECs, the off-hook delay and ISCP look up may result in a TCAP response to the serving EO switch to route CLEC 411/555 calls direct to a trunk designated by the particular CLEC for that purpose. Thus, if a CLEC such as CLEC-1 so chooses, 411/555 calls identified in the ISCP as being CLEC-1 calls, may be directed pursuant to its ISCP database tables to a trunk group shown as 18. The trunk group 18 may deliver such calls to a central CLEC switch or to whatever handling in the CLEC network that CLEC-1 chooses.

Another option to the CLECs would be to have their 411/555 calls routed by the EO switch pursuant to instructions from the ISCP to the same direct trunk or trunk group that the LEC uses to reach the TOPS/OSPS which it employs for 411/555 calls. Such a trunk is shown at 34. It is to be understood that the TOPS/OSPS may be owned and operated by the LEC but also may constitute a third party installation used by the LEC pursuant to contract. If the CLEC chooses to have call branding, the CLEC 411/555 call may be routed via the adjunct processor trunk 26 for handling in the manner just described for 0 calls.

7 digit and 10 digit local calls coming from CLEC lines will hit the off-hook delay trigger in the EO switch to send a query to the ISCP. The response to this query will carry no information other than to let the EO switch route the call according to the dialed numbers. This defaults to the LEC network, i.e., routes autonomously. This is not likely to constitute an objectionable feature in that such calls rarely involve a toll and in effect would be "free" to the CLEC.

In the foregoing specialized routing scenario the current usage of line class codes will be continued. The system thus would involve a hybrid solution using line class codes, AIN, and an adjunct processor to provide the desired results.

EWSD Switch—Siemens

Figure 2:
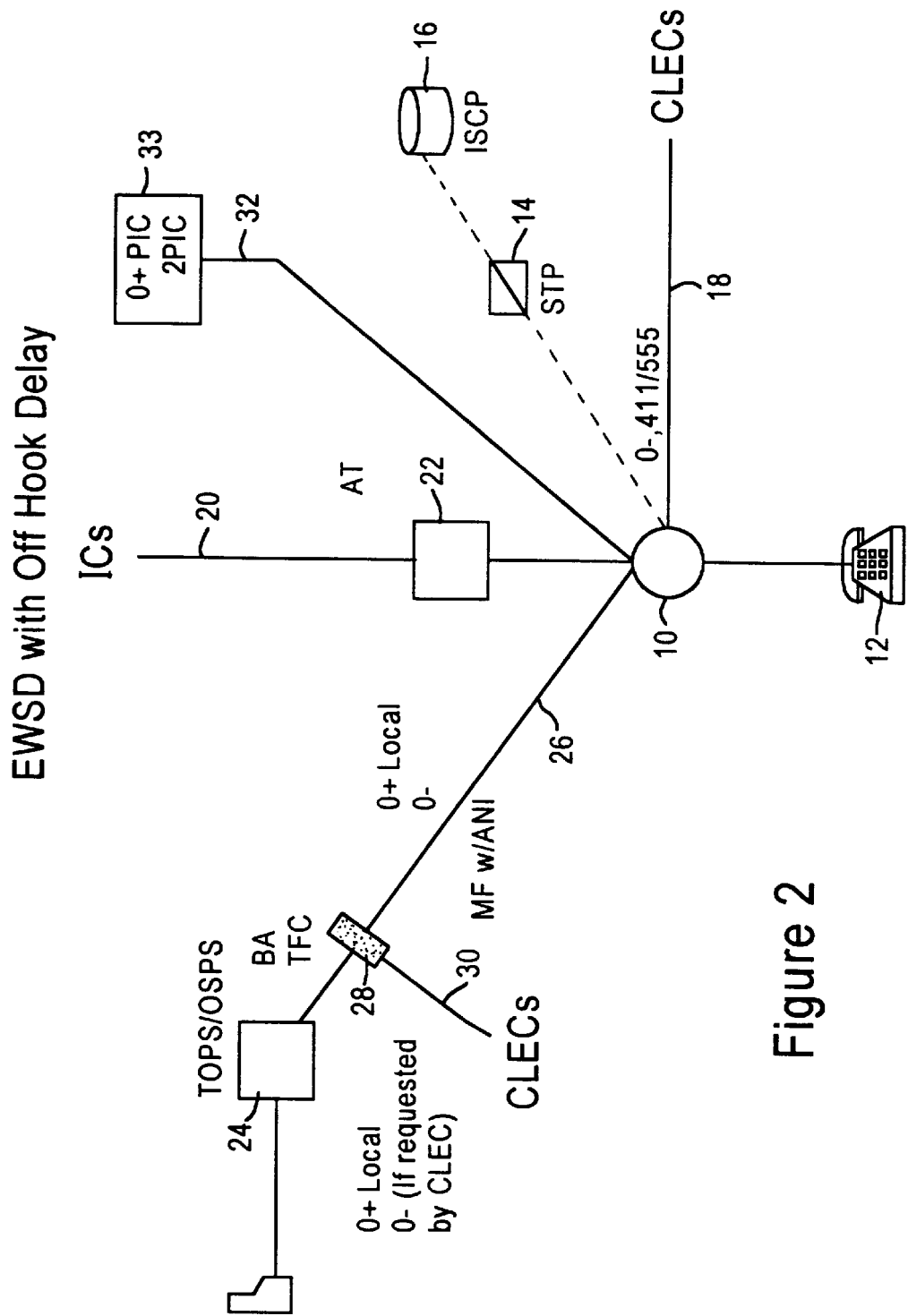
FIG. 2 is a simplified functional block diagram showing the architecture and operation of the system of one embodiment of the invention with respect to Siemens EWSD switches in a local exchange carrier network providing interconnection with a competing local exchange carrier (CLEC).

The AIN capabilities of the EWSD switch permits AIN routing of the 0– calls. As a result 0– calls can be routed directly to the trunk group which may be specified by the CLEC for handling its 411/555 calls. Referring to FIG. 2 it will be seen that the trunk group 18 is designated as handling 0– calls. Thus, as with the 1AESS switch, following the off-hook delay trigger the ISCP will instruct the end office (EO) switch to forward 0– calls directly onto the CLEC trunk group 18, should that be the desire of the CLEC. On the other hand, where the CLEC may choose to have the 0– calls handled by the same TOPS/OSPS that the LEC utilizes, the ISCP may return instructions to forward such calls to the trunk group 26 to adjunct processor 28, where branding may be applied if desired. 0+ local calls would be handled by the adjunct processor and TOPS/OSPS 24 in the manner described above with respect to the 1AESS switch.

1+ ten digit inter LATA long distance calls will be routed using the same primary interexchange carrier PIC methodology described with respect to the 1AESS switch. Thus these calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position or TOPS/OSPS. This is shown in FIG. 2 as the trunk group 32 to the TOPS/OSPS 33.

411/555 directory assistance calls may be handled under the direction of the ISCP following the off-hook delay trigger to either route the calls to the CLEC trunk group 18 (FIG. 2) or to the LEC trunk group 34 (FIG. 1) as described in connection with the 1AESS switch.

7 digit and 10 digit local calls coming from CLEC lines will again be handled in the same manner as with the 1AESS switch. Thus these calls will hit the off-hook delay trigger in the EO switch to send a query to the ISCP. The response to this query will carry no information other than to let the EO switch route the call according to the dialed numbers. This defaults to the LEC network.

DMS-100 Switch—Northern Telecom

Figure 3:
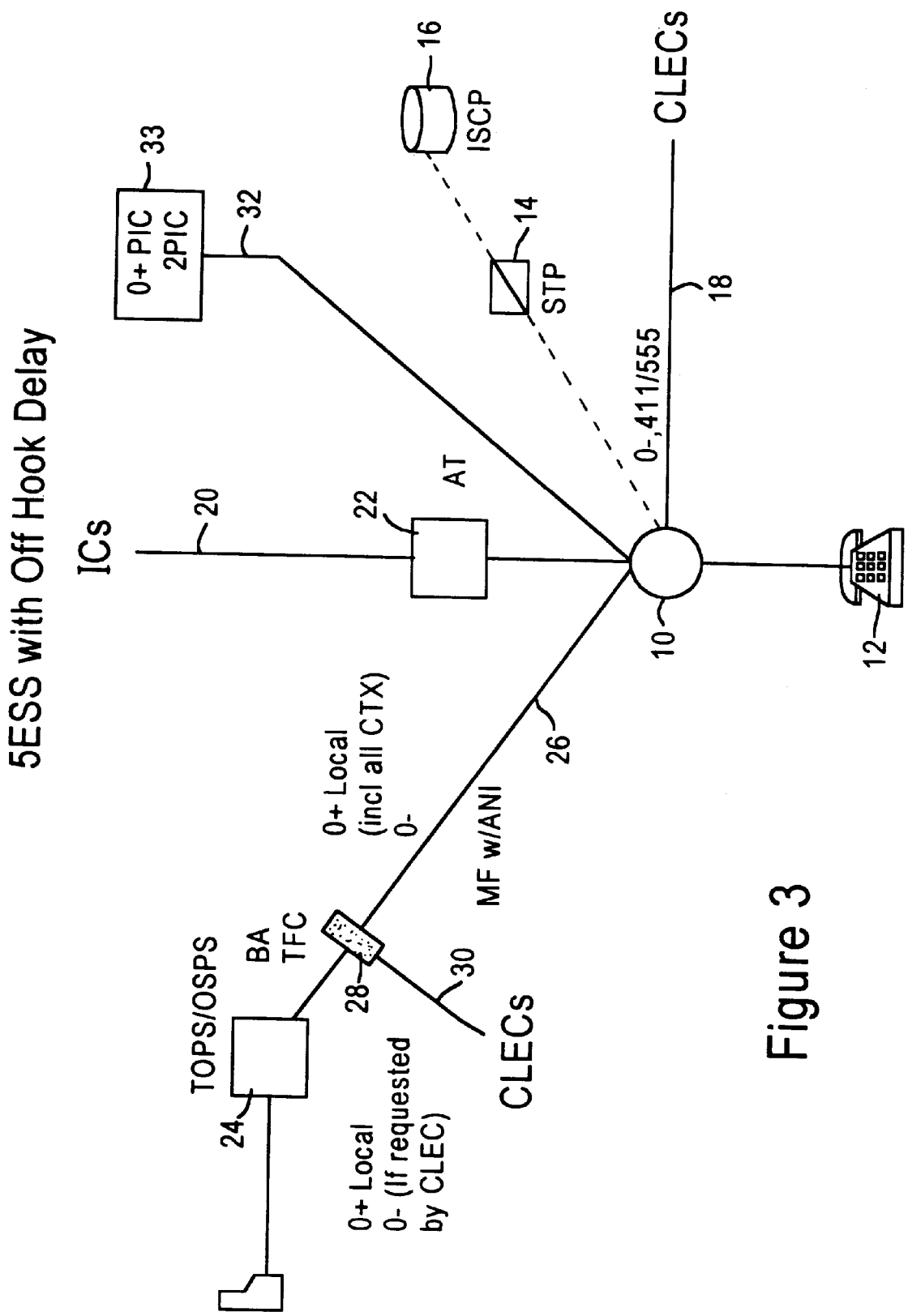
FIG. 3 is a simplified functional block diagram showing the architecture and operation of the system of one embodiment of the invention with respect to AT&T 5ESS switches in a local exchange carrier network providing interconnection with a competing local exchange carrier (CLEC).

0– calls are handled using the AIN functionality. The AIN capabilities of the DMS-100 switch permits AIN routing of the 0– calls. As a result 0– calls can be routed direct to the trunk group which may be specified by the CLEC for handling its 411/555 calls. Referring to FIG. 3 it will be seen that the trunk group 18 is designated as handling 0– calls. Thus, as with the EWSD switch, following the off-hook delay trigger the ISCP will instruct the EO end office switch to forward 0– calls directly onto the CLEC trunk group 18, should that be the desire of the CLEC. On the other hand, where the CLEC may choose to have the 0– calls handled by the same TOPS/OSPS that the LEC utilizes, the ISCP may return instructions to forward such calls to the trunk group 26 to the adjunct processor 28, where branding may be applied if desired.

0+ local calls would be handled by the adjunct processor and TOPS/OSPS 24 in the manner described above with respect to the 1AESS switch.

1+ ten digit inter LATA long distance calls will be routed using the same primary interexchange carrier PIC methodology described with respect to the 1AESS switch. Thus these calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position or TOPS/OSPS. This is shown in FIG. 3 on the trunk group 32 to the TOPS/OSPS 33.

411/555 directory assistance calls may be handled under the direction of the ISCP following the off-hook delay trigger to either route the calls to the CLEC trunk group 18 (FIG. 3) or to the LEC trunk group 34 (FIG. 1) as described in connection with the 1AESS switch.

7 digit and 10 digit local calls coming from CLEC lines will again be handled in the same manner as with the 1AESS switch. Thus these calls will hit the off-hook delay trigger in the EO switch to send a query to the ISCP. The response to this query will carry no information other than to let the EO switch route the call according to the dialed numbers. This defaults to the LEC network.

5ESS Switch—AT&T

Figure 4:
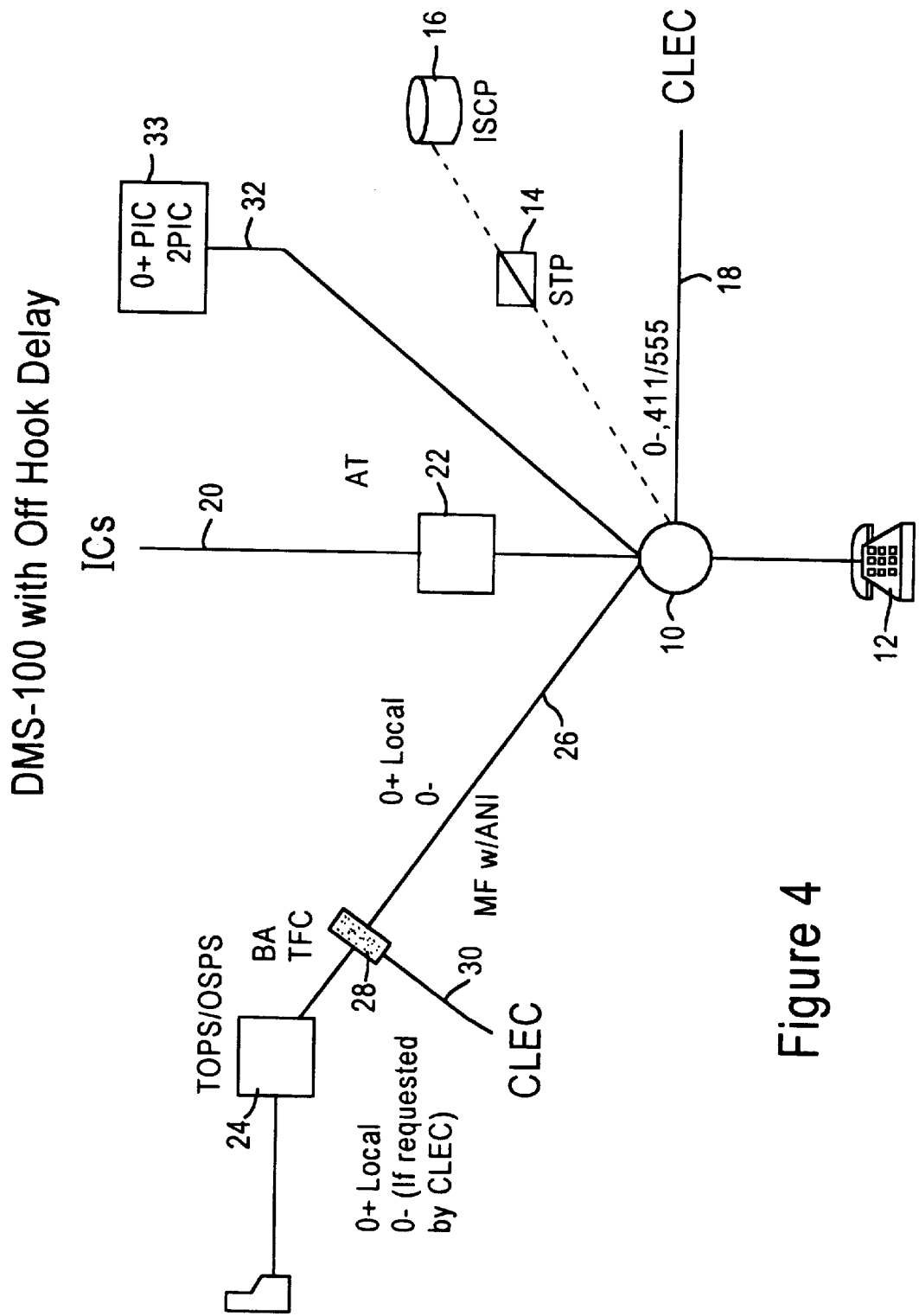
FIG. 4 is a simplified functional block diagram showing the architecture and operation of the system of one embodiment of the invention with respect to NorTel DMS-100 switches in a local exchange carrier network providing interconnection with a competing local exchange carrier (CLEC).

With one significant exception, namely Centrex or PBX calls, 0+ and 0− calls are handled by the 5ESS switch in the same manner as with the EWSD and DMS-100 switches, as just described. 0− calls can be routed directly to the trunk group which may be specified by the CLEC for handling its 411/555 calls. Referring to FIG. 4 it will be seen that the trunk group 18 is designated as handling 0− calls. Thus, as with the EWSD and DMS-100 switches, following the off-hook delay trigger the ISCP will instruct the EO switch to forward 0− calls directly onto the CLEC trunk group 18, should that be the desire of the CLEC. The CLEC may also choose to have the 0− calls handled by the same TOPS/OSPS that the LEC utilizes, the ISCP may return instructions to forward such calls to the trunk group 26 to the adjunct processor 28, where branding may be applied if desired. 0+ local calls would be handled by the adjunct processor and TOPS/OSPS 24 in the manner described above with respect to the 1AESS switch.

With respect to Centrex calls, it is not possible to assign the off-hook delay trigger to Centrex lines. According to the invention, Centrex 0+ and 0− calls all route to the adjunct processor using a line class code (LCC). At the adjunct processor these calls are handled in the same manner as previously described with respect to the 1AESS switch.

1+ ten digit inter LATA long distance calls will be routed using the same primary interexchange carrier PIC methodology described with respect to the 1AESS switch. Thus these calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position or TOPS/OSPS. This is shown in FIG. 4 on the trunk group 32 to the TOPS/OSPS 33.

411/555 directory assistance calls, other than Centrex or PBX calls, may be handled under the direction of the ISCP following the off-hook delay trigger to either route the calls to the CLEC trunk group 18 (FIG. 4) or to the LEC trunk group 34 (FIG. 1), as described in connection with the 1AESS switch. This is shown in FIG. 4 in relation to the trunk groups 18 and 34 respectively. With respect to Centrex/PBX calls, the AIN cannot be utilized and, according to the invention, these are handled using line class codes. The 411/555 calls are directed in this manner to the adjunct processor. The processor handles these calls in the manner previously described with respect to the 1AESS switch.

7 digit and 10 digit local calls coming from CLEC lines will also be handled in the same manner as with the 1AESS switch. Non-Centrex/PBX calls will hit the off-hook delay trigger in the EO switch to send a query to the ISCP. The response to this query will carry no information other than to let the EO switch route the call according to the dialed numbers. This defaults to the LEC network. Centrex calls default to the LEC network.

DMS-10 Switch—NorTel

The DMS-10 switch is a relatively small switch in somewhat limited use in a typical LEC network. The switch has Signaling System 7 (SS7) capabilities but is not capable of using AIN. The switch is adapted to the system of the invention by utilizing the adjunct processor for virtually all-necessary screening. The arrangement is shown in FIG. 5. The system operates as follows:

The calls that are susceptible to being handled by the PIC and 2PIC methodology are handled in that manner as with the switches previously discussed. Thus, the inter LATA and intra LATA long distance calls are directed by the switch and PIC/2PIC to the trunk groups 20 and 32 in FIG. 5, in the same manner as described with respect to FIGS. 1–4.

All other calls, namely 0+ local, 0−, 411, and 555 calls, are directed by switch translations from the switch 10 to the trunk group 26 and adjunct processor 28. The processor is provided with adequate database tables to perform the desired screening and direct CLEC calls to CLEC facilities via trunk group 30, and to direct LEC calls to the TOPS/OSPS 24.

In the operations of the embodiment of the invention described in connection with FIGS. 1–7, switch limitations in call differentiation result in local non-service calls defaulting to anonymous handling or routing by the LEC. The systems illustrated in FIGS. 8–10 provide a mechanism for detecting and routing local calls to solve this problem, whereby CLECs may have an option to specify routing of the CLEC's choice.

Referring to FIG. 8 there is shown a LEC network represented by the EOs 110 and 112 connected by trunk 114. The EOs have SSP capability and are connected by SS7 data links 116 and 118 to STP 120. Such EOs are hereinafter sometimes referred to as EO/SSPs. The STP is connected by SS7 data link 122 to ISCP 124. It will be understood that this STP and ISCP represent an AIN network controlling the LEC program controlled switched telephone network. The LEC EO 110 is connected to a plurality of subscriber stations represented in FIG. 8 by subscriber stations A, B, and C. The subscriber stations A and B are LEC subscribers, while station C is a CLEC subscriber.

An interconnection between the LEC network and the CLEC network (not shown) is made via trunk or trunk group 127. There may be connections to the CLEC network by more than one CLEC and multiple trunks or trunk groups may be required, but are not shown in FIG. 8. The LEC network may include a TOPS/OSPS 126 and an adjunct processor 128, as were provided in the embodiments illustrated in FIGS. 1–7. The adjunct processor may be similar to the adjunct processor shown in FIG. 6. For purposes presently to be described, the adjunct processor is connected to the AIN network of the LEC via the SS7 link 130 to the STP 120. In an alternative embodiment, the adjunct processor 128 may communicate with the ISCP 124 via a packet data network such as a TCP/IP network represented in FIG. 8 by the data link 132.

The operation of this arrangement is now described in connection with the flow diagram in FIG. 9. It is to be recalled that this embodiment of the invention provides a mechanism for providing CLEC specified routing for local calls which formerly were handled autonomously by the LEC network under limitations imposed by the available equipment utilized in the network architecture. The call handling according to those embodiments of the invention is summarized in the table in FIG. 7. The present embodiment of the invention presents a solution to the problem.

In this illustrative example of the embodiment of the invention shown in FIG. 8, the CLEC subscriber at station C initiates a local call by going off-hook and dialing the-called local number. This action is indicated at step S1 showing actuation of the off-hook delay trigger which is set for each CLEC line or port as previously described. In this example the trigger is actuated in the EO/SSP 110. Responsive to this actuation the EO/SSP launches an SS7 query message to the ISCP at step S2. The query message includes the called and calling numbers and requests the ISCP to access its database to determine whether or not the calling number represents a station that is a CLEC subscriber. The message further seeks information identifying the CLEC to which the station C subscribes, if more than one CLEC is interconnected to the LEC network. The ISCP database includes a call processing record (CPR) for both the unbundled and resold ports in the LEC switches and thus can direct the switch or EO/SSP 110 as to the manner in which calls from the CLEC stations are to be handled.

In addition to the foregoing information it is also desirable to determine whether or not the call from station C is a local call. According to one embodiment of the invention this determination is implemented by providing the database at the adjunct processor with a DNA-NXX to DNA-NXX table. A search of this table will provide the desired response as to whether the particular call dialed by station C is local.

Each time that the ISCP is queried in response to the off-hook delay trigger, a query is sent from the ISCP to the adjunct processor inquiring as to whether or not the call is local. If the SS7 network embodiment is used, the query may be launched from the ISCP via the STP 120 and SS7 link 130. If the TCP/IP network is used, the ISCP may launch a get data interface (GDI) query, over the TCP/IP network indicated at 132. The launch of this query to the adjunct processor is shown at step S3. The response to the query is shown as being provided at the decision block S4, and is delivered to the originating EO/SSP 110.

If the response at step S4 is negative, indicating that the call is not a local call, the EO/SSP 110 performs its PIC/PIC2 (or 1PIC/2PIC) routine. At step S5 the switch or EO/SSP determines if a PIC (which may be referred to as a 1PIC) exists. If so, the call is directed by the switch to the 1PIC point of presence or POP at step S6. If, on the other hand there is no 1PIC, it is then determined by the EO/SSP at step 7 whether or not there is a 2PIC. If there is a 2PIC the switch routes this to the 2PIC POP at step S8. If there is no 2PIC, the call may be further routed by the EO/SSP in accord with existing procedures.

If the local/not local response at step S4 is affirmative, a local call is involved. This information is delivered to the EO/SSP 110 in response to the original query occasioned by the off-hook delay trigger. The response to the EO/SSP also includes the information which was obtained by the ISCP in the response to the step S2 query as to whether the calling station was a CLEC subscriber. That response included a route index or equivalent information to direct the EO/SSP to select a trunk to the indicated CLEC. This is illustrated by the decision block S9. If the calling station is a CLEC subscriber, the call is routed to the specified CLEC at its identified trunk at step S10. This is implemented by the EO/SSP 110 by routing the call to the trunk group 126 in FIG. 8. Once the call is connected to this trunk, the subsequent handling is in the hands of the CLEC. If the response at the decision block S9 is negative, i.e., that the call is not a CLEC call, the call is then handled autonomously by the LEC at step S11.

In the arrangement shown in FIG. 8 the adjunct processor is used to receive and respond to inquiries as to whether or not a particular call is local. As has been described in relation to the previously described embodiments of the invention illustrated in FIGS. 1–7, the adjunct processor performs multiple functions. The adjunct processor first accesses its database to determine whether calls are to be routed to a CLEC trunk. Once that has been determined the switch associated with the processor serves the additional function of switching the necessary voice lines in accord with that determination.

In the manner in which the adjunct processor is used to accomplish the purpose of this feature of the invention, the adjunct does not perform a switching function but supplies the response to the previously unanswered local/not local inquiry. For this purpose the switching functionality is unnecessary. As a result it is not required that the DNA-NXX to DNA-NXX database functionality be collocated with the adjunct processor. In other words, it is not necessary that the adjunct processor utilized in the embodiments of FIGS. 1–7 be used to supply the necessary DNA-NXX to DNA-NXX database purpose.

While the database in the ISCP might be considered as a means for making the local/not local determination, the architecture of the ISCP database is not such that the needed DNA-NXX to DNA-NXX data could be accommodated.

FIG. 10 shows an embodiment of the invention in which a separate DNA-NXX to DNA-NXX database is utilized. Referring to that figure, there is shown the same LEC network represented by the EOs 110 and 112 connected by trunk 114 which was shown in FIG. 8. Again the EOs have SSP capability and are connected by SS7 data links 116 and 118 to STP 120. The STP is connected by the SS7 data link 122 to ISCP 124. The LEC EO/SSP 110 is connected to a plurality of subscriber stations represented in FIG. 10 by subscriber stations A, B, and C. Again the subscriber stations A and B are LEC subscribers, while station C is a CLEC subscriber. An interconnection to the CLEC network (which is not itself shown) is made via trunk or trunk group 126. There may be more than one CLEC and multiple trunks or trunk groups may be required but are not shown in this figure.

According to this embodiment, the LEC network includes a storage 134 which comprises a CPU 136 and a database 138. In one alternative embodiment, the CPU 136 may be connected to the ISCP via a TCP/IP packet data link 140. In a second alternative embodiment, the CPU may be connected to the ISCP via an SS7 link to the STP 120. The operation of this separate storage embodiment of the invention is similar to that described in FIG. 9, with the exception that the adjunct processor DNA-NXX to DNA-NXX database referred to connection with FIG. 9 is replaced by the DNA-NXX to DNA-NXX database maintained in the storage 134 in FIG. 10.

When the system of the invention shown in FIGS. 8–10 is used in conjunction with and in the environment of the system described in FIGS. 1–7, the switching functionality of the adjunct processor is needed to switch the voice trunks and/or lines. In such a situation there is an advantage to using the database in the adjunct processor for the DNA-NXX to DNA-NXX tables, rather than a separate storage.

The database used in the adjunct processor is adapted to store the desired NPA-NXX to NPA-NXX data and this permits using the available adjunct processor facility for a double purpose. When an adjunct processor is configured to perform this function it may be viewed as a modified SSP capable program controlled switch. That is to say that, whereas a conventional SSP switch is programmed to launch or send queries, as in response to the off-hook delay trigger previously described, the adjunct processor used in the embodiment of the invention shown in FIG. 8 is also programmed to receive and respond to inquiries.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of call routing for a local exchange carrier (LEC) operating a local exchange advanced intelligent network (AIN) controlled carrier network and one or more competing local exchange carriers (CLECs) having interconnection to end office switches in said LEC AIN controlled network, said method comprising the steps of:
   a) setting in end office switches in said AIN controlled LEC network which are connected to CLEC subscriber stations and which have service switching point (SSP) capability, an originating trigger for said CLEC subscriber stations;
   b) initiating a call from one of said CLEC subscriber stations;
   c) activating said trigger in the end office switch to which said CLEC subscriber station is connected;
   d) responsive to the activation of said trigger sending from said end office switch to which said CLEC station is connected a message to a control point in said AIN;
   e) responsive to receipt of said message at said control point accessing a first database to determine if the call which activated said trigger is a local call;
   f) if it is determined that said call is a local call, accessing a second database to identify the CLEC to which the calling station subscribes; and
   g) routing the call in accordance with procedures pre-established by the CLEC identified.

2. A method according to claim 1 wherein said procedures pre-established by said identified CLEC are determined by accessing said second database.

3. A method according to claim 2 including the step of accessing in said second database a call processing record (CPR).

4. A method according to claim 1 wherein said routing in step (g) is responsive to a message from said control point to the end office switch in which said trigger was activated.

5. A method according to claim 1 including the steps of:
   if it is determined that said call is not a local call, determining whether said call is an inter or intra LATA call; and routing said call via primary interexchange carrier (PIC) functionality to the point of presence (POP) indicated by said intra or inter LATA determination.

6. A method according to claim 1 including the step of accessing in said first database a DNA-NXX to DNA-NXX table.

7. A method according to claim 1 wherein said accessing of said second database to identify the CLEC to which the calling station subscribes is performed at said control point.

8. A method according to claim 1 wherein said first database is located in an adjunct device in said LEC network, said adjunct device having program controlled switching capabilities.

9. A method according to claim 8 including the step of switching service calls from said calling station through said adjunct device to a service platform capable of providing the desired service.

10. A method according to claim 9 wherein said switching of service calls through said adjunct device is at least partially controlled by accessing CLEC call processing data stored in said second database.

11. A telecommunications system comprising a first local exchange carrier (LEC) network, and a second competing local exchange carrier (CLEC) network, comprising in combination:
   an end office switching system in said LEC network, said end office switching system having signal switching point (SSP) capability and being connected to a plurality of subscriber stations, at least a first of said subscriber stations being a subscriber of said LEC network, and a second of said subscriber stations being a subscriber of said CLEC network;
   an advanced intelligent network (AIN) platform in said LEC network including a control point and a first database;
   a second database linked to said control point by a packet data network;
   said end office switching system having an originating trigger set therein, wherein:
      a call from said second of said subscriber stations activates said trigger and causes said end office switching system to send a query message to said control point causing said control point to access said first and second databases to identify the CLEC to which said second station subscribes, determine if the call is a local call, and if said call is a local call, to send a response message to said switching system directing the routing of said local call via said CLEC or LEC network in accord with information obtained from said databases, said switching system routing said call pursuant to said routing directions.

12. A telecommunications system according to claim 11 wherein said AIN platform and said packet data network use the same signaling protocol.

13. A telecommunications system according to claim 11 wherein said AIN platform and said packet data network use different signaling protocols.

14. A telecommunications system according to claim 11 wherein said AIN platform and said packet data network use signaling system 7 (SS7) protocol.

15. A telecommunications system according to claim 11 wherein said AIN platform uses signaling system 7 (SS7) protocol and said packet data network uses transmission control protocol/Internet protocol (TCP/IP).

16. A telecommunications system according to claim 11 wherein said second database has stored therein a DNA-NXX to DNA-NXX table.

17. A telecommunications system according to claim 11 wherein said second database is associated with and controlled by a central processing unit (CPU) which also controls a switch which switches voice circuits connected to said LEC and CLEC networks.

18. A telecommunications system according to claim 17 wherein said switch directs service calls made by CLEC subscriber stations to facilities of said CLEC or said LEC.

19. A telecommunications system according to claim 18 wherein said switch directs said service calls made by CLEC subscriber stations based on information obtained from said second database.

20. A telecommunications system according to claim 18 wherein said switch directs said service calls made by CLEC subscriber stations to operator service platforms of said CLEC or said LEC.

21. A telecommunications system according to claim 19 wherein said second database has stored therein DNA-NXX to DNA-NXX tables in addition to call processing records for service calls made from CLEC subscriber stations.

22. A telecommunications system according to claim 11 wherein said originating trigger is an off-hook delay trigger.

23. A telecommunications system comprising a first local exchange carrier (LEC) network, a second competing local exchange carrier (CLEC) network, and an interexchange carrier network (IXC) comprising in combination:

an end office switching system in said LEC network, said end office switching system having signal switching point (SSP) capability and being connected to a plurality of subscriber stations, at least a first of said subscriber stations being a subscriber of said LEC network, and a second of said subscriber stations being a subscriber of said CLEC network;

an advanced intelligent network (AIN) platform in said LEC network including a control point and a first database;

a second database linked to said control point by a packet data network;

said end office switching system having an originating trigger set therein, wherein:

a call from said second of said subscriber stations activates said trigger and causes said end office switching system to send a query message to said control point causing said control point to access said first and second databases to identify the CLEC to which said second station subscribes, determine if the call is a local call, and if said call is a local call, to send a response message to said switching system directing the routing of said local call via said CLEC or LEC network in accord with information obtained from said databases, said switching system routing said call pursuant to said routing directions;

an interexchange carrier call being routed via primary interexchange carrier (PIC) functionality in said switching system to the point of presence (POP) of said IXC.

* * * * *

UNITED STATES PATENT AND TRADEMARK OFFICE
CERTIFICATE OF CORRECTION

PATENT NO. : 5,903,639
DATED : May 11, 1999
INVENTOR(S) : Lipchock, et. al.

It is certified that error appears in the above-identified patent and that said Letters Patent is hereby corrected as shown below:

Title page,

After "[75]   Inventors: Michael J. Lipchock, Frederick, MD;
                        Douglas R. Jones, Mount Laurel, NJ",
please insert --          James A. Manuel, Brookville, MD;
                        John H. Wurster, Baskin Ridge, NJ --.

Signed and Sealed this

Twenty-seventh Day of June, 2000

Attest:

Q. TODD DICKINSON

Attesting Officer

Director of Patents and Trademarks